US010161777B2

(12) United States Patent
Stuyvenberg et al.

(10) Patent No.: US 10,161,777 B2
(45) Date of Patent: Dec. 25, 2018

(54) WATER METER WITH MAGNETICALLY DRIVEN FLOW RESTRICTION VALVE

(71) Applicant: Badger Meter, Inc., Milwaukee, WI (US)

(72) Inventors: Matthew Stuyvenberg, Menomonee Falls, WI (US); Matthew Dellemann, Waukesha, WI (US)

(73) Assignee: Badger Meter, Inc., Milwaukee, WI (US)

( * ) Notice: Subject to any disclaimer, the term of this patent is extended or adjusted under 35 U.S.C. 154(b) by 200 days.

(21) Appl. No.: 15/182,225

(22) Filed: Jun. 14, 2016

(65) Prior Publication Data
US 2017/0356779 A1   Dec. 14, 2017

(51) Int. Cl.
  *G05D 7/00*   (2006.01)
  *G01F 15/00*  (2006.01)
  *G01F 1/66*   (2006.01)

(52) U.S. Cl.
  CPC ............ *G01F 15/00* (2013.01); *G01F 15/005* (2013.01); *G05D 7/00* (2013.01); *G01F 1/66* (2013.01); *G01F 1/662* (2013.01)

(58) Field of Classification Search
  CPC .......... G01F 15/00; G01F 15/005; G01F 1/66; G01F 1/662; G05D 7/00
  USPC ........................................ 251/65; 137/487.5
  See application file for complete search history.

(56) References Cited

U.S. PATENT DOCUMENTS

| 556,895 | A | * | 3/1896 | Moore ................. F16K 3/0281 |
| | | | | 137/242 |
| 2,346,904 | A | * | 4/1944 | Carlson ................. F16K 31/088 |
| | | | | 251/65 |
| 3,347,262 | A | * | 10/1967 | Gibson ................. F16K 31/088 |
| | | | | 251/65 |
| 3,747,892 | A | * | 7/1973 | Gigantino ............... F16K 31/02 |
| | | | | 251/308 |
| 4,382,449 | A | | 5/1983 | Nelson |
| 4,489,918 | A | * | 12/1984 | Kalsi ....................... F16K 3/186 |
| | | | | 251/167 |

(Continued)

FOREIGN PATENT DOCUMENTS

| CA | 1117785 A | 2/1982 |
| CN | 201322131 Y | 10/2009 |

OTHER PUBLICATIONS

Water Meters—Selection, Installation, Testing, and Maintenance, AAWA, copyright 2012.*

*Primary Examiner* — Eric Keasel
(74) *Attorney, Agent, or Firm* — Boyle Fredrickson, S.C.

(57) ABSTRACT

A utility flow meter including a valve having a pressure vessel providing a flow path from a meter inlet to a meter outlet through the valve is magnetically driven. The meter includes a valve member positioned within the valve in the pressure vessel for movement between an open position allowing normal flow through the flow meter and a flow restriction position in which flow through the flow meter is limited to less than the normal flow and an electrically operable control device for controlling movement of the valve member including a dry-side magnet assembly and a wet-side magnet assembly. The electrically operable control device receives command signals to rotate the dry-side magnet assembly to move the valve member and thereby increase or decrease flow through the metering chamber.

18 Claims, 6 Drawing Sheets

(56) References Cited

U.S. PATENT DOCUMENTS

| | | | | |
|---|---|---|---|---|
| 4,986,085 A * | 1/1991 | Tischer | ............... | F16K 31/04 |
| | | | | 251/129.11 |
| 5,611,368 A * | 3/1997 | Hwang | ............... | F16J 15/50 |
| | | | | 137/553 |
| 6,085,772 A | 7/2000 | McGill et al. | | |
| 6,405,755 B1 | 6/2002 | Doehla et al. | | |
| 7,819,378 B2 * | 10/2010 | Jennings | ............... | F16K 3/186 |
| | | | | 251/175 |
| 8,539,827 B2 * | 9/2013 | Benson | ............... | G01F 15/005 |
| | | | | 251/129.01 |
| 8,567,757 B2 | 10/2013 | Pitchford et al. | | |
| 8,662,473 B2 * | 3/2014 | Comeaux | ............... | F16K 3/20 |
| | | | | 251/174 |
| 8,690,117 B2 * | 4/2014 | Dunn | ............... | G01F 25/0007 |
| | | | | 251/129.01 |
| 8,807,523 B2 | 8/2014 | Pitchford et al. | | |
| 8,833,390 B2 * | 9/2014 | Ball | ............... | G01F 15/14 |
| | | | | 137/552 |
| 8,915,481 B2 | 12/2014 | Neuhaus | | |
| 2012/0090702 A1 * | 4/2012 | Shalev | ............... | G01F 1/66 |
| | | | | 137/486 |
| 2014/0061519 A1 | 3/2014 | Pitchford et al. | | |

\* cited by examiner

WATER METER WITH MAGNETICALLY DRIVEN FLOW RESTRICTION VALVE

FIELD OF THE INVENTION

This application relates to utility metering equipment and to shut-off valves for interrupting or limiting the supply of water from a public utility to a customer. More specifically, this application relates to utility metering equipment having a magnetically driven shut-off valve for interrupting or limiting the supply of water.

BACKGROUND

Utility metering equipment is often provided with a radio transmitter or a radio transceiver (receiver/transmitter) for transmitting meter consumption data to a radio receiver in a meter data collection network. Some networks for collection metering data have provided the ability to control devices at the metering site by using a two-way communication through a site transceiver. In recent years, utilities and equipment providers have been considering alternatives for shut-off of service in emergency events, for conservation purposes, or in the event of non-payment of utility bills. Therefore, various methods for remote shut-off of the utility water supply are being investigated.

One type of shut off apparatus that is currently offered on the market to perform a water supply shut-off uses a valve external to the water meter or a radio requiring an external source of power for operation. This apparatus requires the customer to run an additional power source to the meter and to modify their plumbing to accommodate the additional lay length of the external valve.

According to another alternative in which a shut off valve is integrated into a meter housing, Marchesi, U.S. Pat. No. 3,795,144, discloses a manually operable shut-off valve having a housing that is integrated with a water meter housing. The purpose of this construction is to prevent removal of the valve without also removing the meter and thereby causing an inconvenience to the owner of flooding of the establishment (col. 5, lines 5-8). It is thus a tamper-resistance measure.

The type of shut off apparatus described in the Marehesi reference and other examples in the prior art are water meters having an integral shut off valve that uses a mechanical coupling to provide the valve actuation forces. Mechanical couplings require use of a dynamical seal, such as an o-ring or diaphragm, which are prone to failure/leakage. Dynamic seals degrade over time and develop cracks, tears, and/or increased rigidity, for example. These failures can require replacement of the entire water meter where the shut off valve is integral to the meter.

Some types of meters, particularly in the gas industry to deal with hazards of leaking gases in emergency situations, contemplate the use of magnetically actuated shut off valves. However, these meters typically are unsuitable for use in water metering, applications because of the unique constraints that exist in water metering applications, such as maximizing power efficiency, factoring in pressure differentials, maximizing valve life, etc. The constructions known in the art do not provide the convenience and functionality desired in controlling or limiting supply of a utility, particularly a water meter to a customer while avoiding the use of dynamic seals.

SUMMARY OF THE INVENTION

This invention houses a water meter and a magnetically driven valve, wherein the magnetically driven valve is a flow restriction valve. The invention may include the valve and water meter integrated in a common pressure vessel.

In one embodiment, the invention provides a utility flow meter including a magnetically driven valve, the meter having a pressure vessel providing a flow path from a meter inlet to a meter outlet. The meter includes a valve member positioned within the valve in the pressure vessel for movement, between an open position allowing normal flow through the flow meter and a flow restriction position in which flow through the flow meter is limited to less than the normal flow and an electrically operable control device for controlling, movement of the valve member including a dry-side magnet assembly and a wet-side magnet assembly. The electrically operable control device receives command signals to rotate the dry-sick magnet assembly to move the valve member and thereby increase or decrease flow through the metering chamber.

In another more detailed aspect, the electrical control device receives power from a self-contained power source. The utility flow meter is further configurable such that rotation of the dry-side magnet assembly causes rotation of a wet-side magnet assembly based on a magnetic coupling between the assemblies through a static seal. The rotation of a wet-side magnet assembly causes movement of the gate from a full open position towards a closed position to restrict flow.

In another more detailed aspect, to interrupt flow, the gate is positioned in front of a valve outlet in a closed position and forced in the direction of the valve outlet when there is flow within the utility flow meter. The gate may be configured for movement along a lead screw substantially perpendicular to the path of flow through the utility meter.

In another more detailed aspect, the utility flow meter is configured such that the flow through the utility flow meter is not completely interrupted or shut-off. When the gate is in the full closed position, flow through the utility flow meter is less than the normal flow, but is a measureable flow sufficient for basic human needs.

In another more detailed aspect, the utility flow meter includes a utility measurement system positioned upstream from the integral valve, such that flow passes from the utility measurement system to the integral valve. The utility measurement system may be an ultrasonic measurement system.

In another more detailed aspect, the utility flow meter is configured such that the electrically operated control device includes a motor selected to overcome frictional force in the valve and a calculated, pressure differential for the valve to minimize electrical power needed to actuate the flow control valve in the pressure vessel. To work against frictional force the electrically operated control device may be in communication with the utility measurement system to control the gate based on a detected zero or minimal flow.

In another embodiment, the invention provides a magnetically driven valve for controlling movement of a valve member in a flow path. The valve includes a valve member positioned within the flow path for movement between an open position allowing normal flow and a flow restriction position in which flow is limited to less than the normal flow and an electrically operable control device for controlling movement of the valve member including a dry-side magnet assembly and a wet-side magnet assembly. The electrically operable control device receives command signals to rotate the dry-side magnet assembly to move the valve member and thereby increase or decrease flow along the flow path.

In another embodiment, the invention provides a utility flow meter including a valve having a pressure vessel providing a flow path from a meter inlet to a meter outlet through the valve. The meter includes a pressure vessel formed to contain the valve positioned downstream from a flow measurement system in a pressure vessel having a same length as a standard water meter, a valve member positioned within the valve in the pressure vessel for movement between an open position allowing normal flow through the flow meter and a flow restriction position in which flow through the flow meter is limited to less than the normal flow, and an electrically operable control device for controlling movement of the valve member including a dry-side magnet assembly and a wet-side magnet assembly. The electrically operable control device receives command signals to rotate the dry-side magnet assembly to move the valve member and thereby increase or decrease flow through the metering chamber.

Other aspects of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF INVENTION

Figure 1:
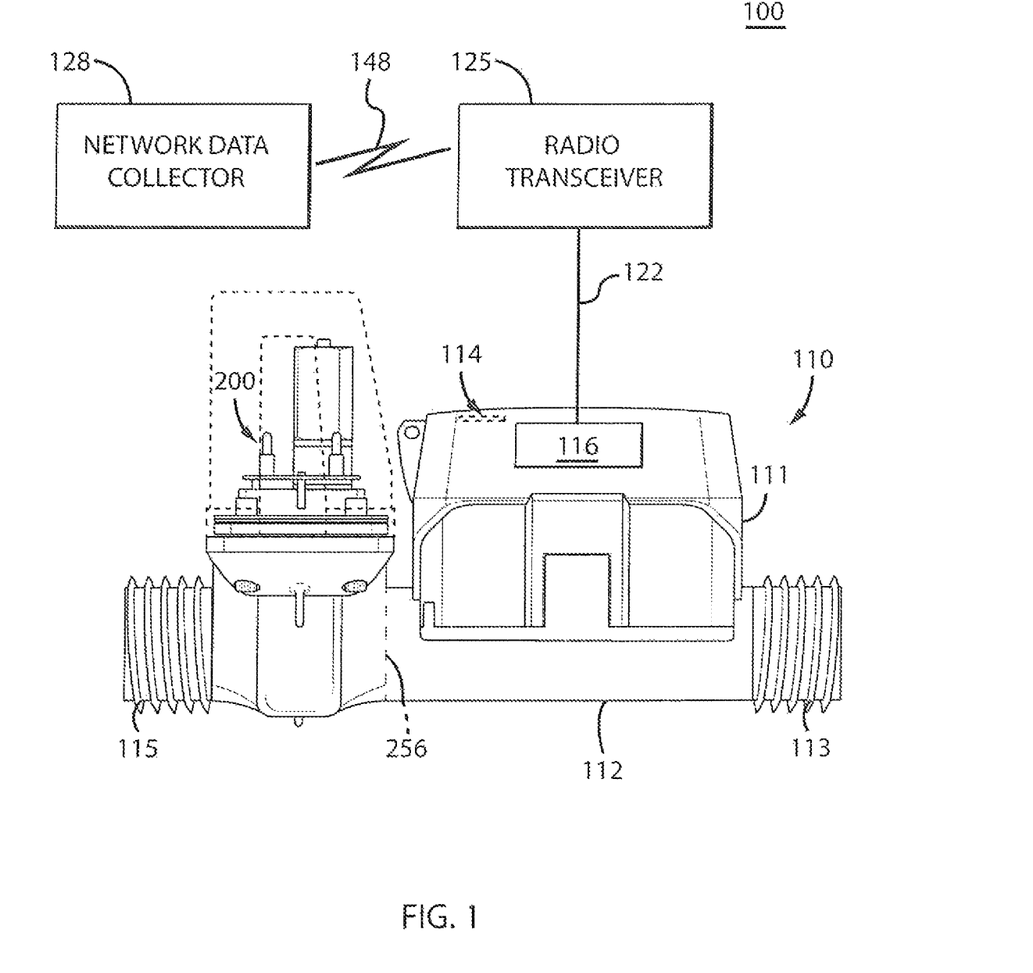
FIG. 1 is a side view of a metering assembly including an integral magnetically driven valve with the control circuit being shown schematically, according to an exemplary embodiment.

FIG. 1 shows a utility metering system 100, according to an exemplary embodiment. An ultrasonic water meter 110 includes a meter housing 111, an integral magnetically driven gate valve 200, and a pressure vessel 112 having an upstream spud end 113 and a downstream spud end 115. The spud ends 113, 115 of the pressure vessel 112, although shown as threaded pipe ends, can be replaced by coupling flanges in larger sized meters. Meter housing 111 may be configured to be totally encapsulated, weatherproof and UV-resistant. The meter housing 111 includes a display 114 that may be configured as a 9-digit LCD display for displaying a measured rate of flow, a reverse-flow indication, alarms, etc. to complete the enclosure as is known in the art.

Ultrasonic water meter 110 may be configured with a solid state, ultrasonic measurement system 116. As water flows into the measuring tube, pressure vessel 112, through the upstream spud end 113, ultrasonic signals are sent consecutively in forward and reverse directions of flow prior to the water exiting the pressure vessel 112 at a valve inlet 256 into magnetically driven valve 200, further described below with reference to FIGS. 2-5, before exiting the water meter 110 through downstream spud end 115. Velocity of the water is then determined by measuring the time difference between the measurement in the forward and reverse directions. Total flow volume is calculated from the measured flow velocity using water temperature and pipe diameter. The LCD display 114 shows the total volume and alarm conditions and can toggle to display rate of flow.

Although not shown, additional elements and electronic components of the ultrasonic measurement system 116 are positioned within the pressure vessel 112, such as a polymer/stainless steel metering insert and the transducers generating and receiving the ultrasonic signals. The metering insert holds the stainless steel ultrasonic reflectors in the center of the flow area of the pressure vessel 112, facilitating minimally turbulent or non-turbulent water flow through the pressure vessel 112 and around the ultrasonic signal reflectors. According to an exemplary embodiment, the valve 200 is formed within the meter 110 such that the valve 200 is implemented within the pressure vessel 112.

The measured and calculated values, including the flow value, may be converted to electrical pukes which are counted as units of consumption of water. These signals 122 are transmitted through a cable to a radio transceiver 125 in the case of a separate assembly. In alternative embodiments, these signals 122 can also be transmitted through an internal electrical connection to a radio transceiver 125 that is assembled with the ultrasonic measurement system 116 in a single housing or an integrated housing, such as meter housing 111.

The radio transceiver 125 includes a radio transmitter portion and a radio receiver portion. The radio transmitter portion converts the measurement system signals to a radio frequency signaling protocol for transmission back to a network data collector 128 through a wireless network. Although, this embodiment includes an electronic type of meter register, it should be understood that the invention can be practiced with electromechanical types of meter registers. As long as some type of electric signal generating meter is used, it will typically be used with a radio transceiver 125 to receive command signals 148 to operate a flow restriction valve 200. Alternatively, valve 200 may be operated through an infrared (IR) port on the valve housing as needed, such as based on an issue with the transceiver 125.

Although an ultrasonic type water meter 110 is shown and described, the invention in its broadest scope can also be applied to other types of water meters, including turbine type meters, mag meters and disc-type meters. Ultrasonic type water meter 110 is configured to include both the ultrasonic measurement system 116 and the magnetically driven gate valve 200 inclusive to the lay length of a standard water meter such that additional retrofits to install the meter and valve aren't required.

Figure 2A:
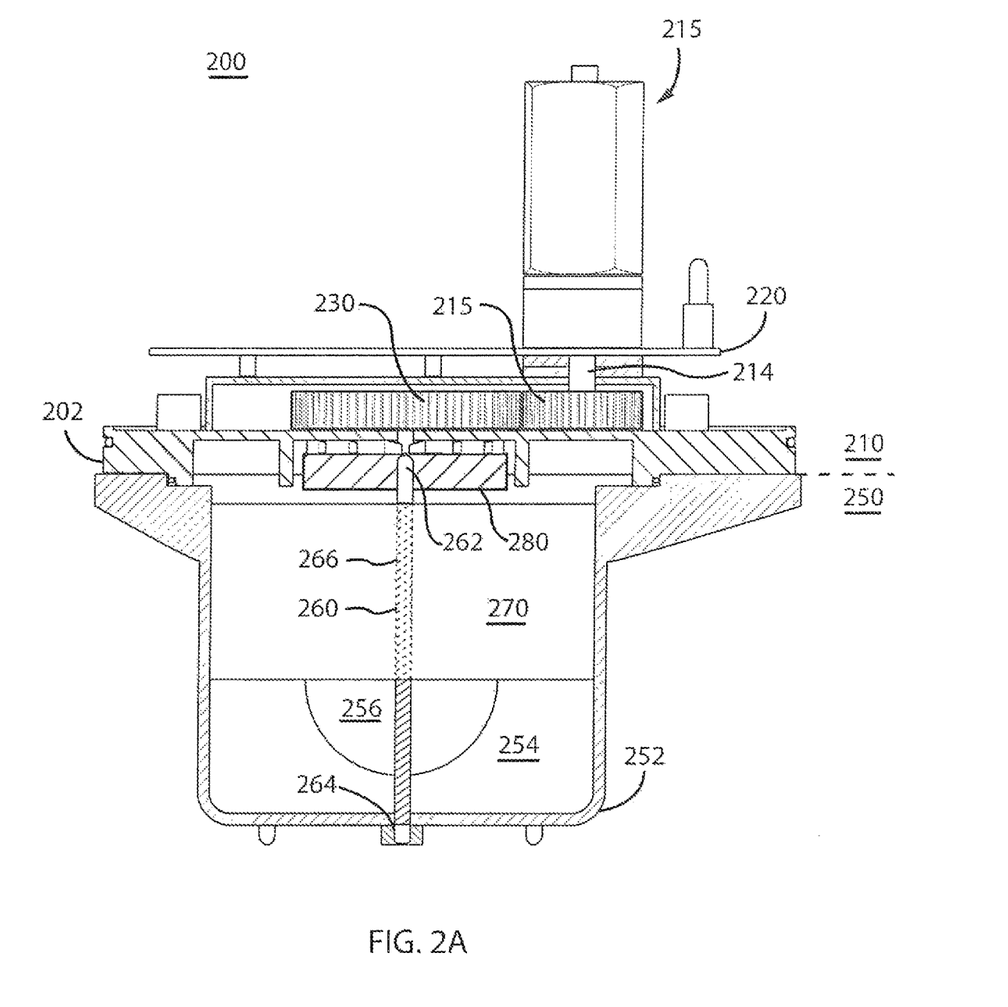
FIGS. 2A and 2B are front and side cut away views of the integral magnetically driven valve of FIG. 1, according to an exemplary embodiment.
Figure 2B:
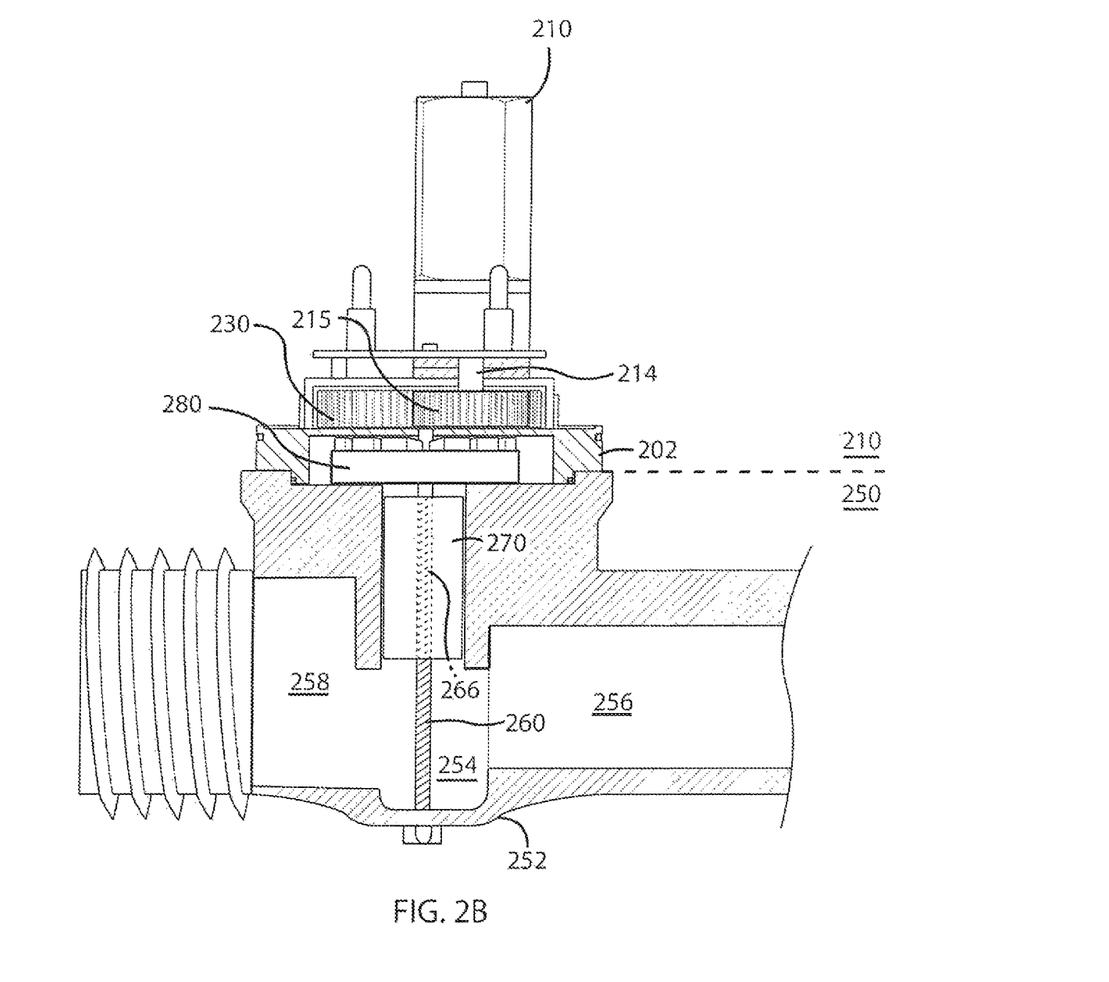

Referring now also to FIGS. 2A and 2B, cut away front and side views, respectively, of a magnetically driven valve 200 are shown, according to an exemplary embodiment. Although valve 200 is shown and described herein as a gate valve, the magnetically driven valve described may be implemented using any of a variety of valve types in a variety of configurations. Further, although valve 200 is shown and described herein as being formed integrally within water meter 110, the valve 200 may alternatively be implemented as a standalone or external valve.

The magnetically driven gate valve 200 includes a dry-side top portion 210, a wet-side bottom portion 250, and a bonnet 202 separating the two portions. Dry-side top portion 210 includes at least a drive motor assembly 215, a control component 220, and a dry-side magnet assembly 230. Wet-side bottom portion 250 includes at least a valve housing 252, a valve flow cavity 254, a valve inlet 256, a valve outlet 258, a lead screw 260, a gate 270, and a wet-side magnet assembly 280.

Gate valve 200 does not have a dynamic seal between the dry-side 210 and the wet side 250. Communication of actuating forces between the dry-side 210 and the wet side 250 is provided by a magnetic coupling between the dry-side magnet assembly 240 and the wet-side magnet assembly 280 through the bonnet 202.

Figure 3A:
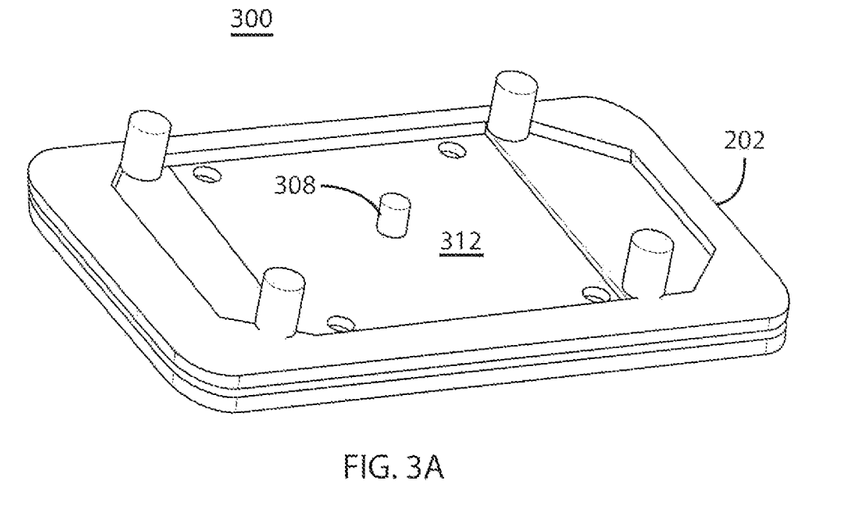
FIGS. 3A and 3B are top and bottom perspective views of a bonnet of the integral magnetically driven valve of FIG. 1, according to an exemplary embodiment.
Figure 3B:
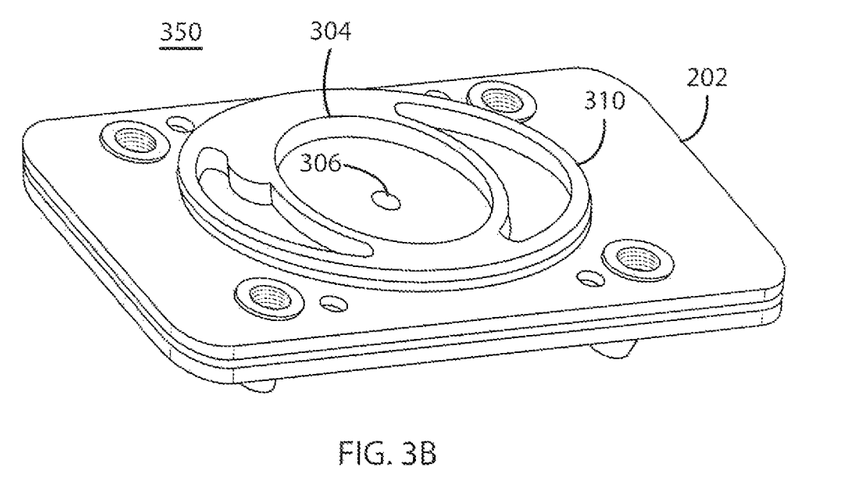

Referring now to FIGS. 2A, 2B, 3A and 3B, bonnet 202 is shown in FIG. 3A in a top-down perspective view 300 and in FIG. 3B in a bottom-up perspective view 350. In the physical coupling between the dry-side 210 and the wet side 250, bonnet 202 provides a static seal using by a radial o-ring seal 310 on the wet-side of the bonnet 202. When physically coupled, the pressure vessel 212 and the valve flow opening cavity 254 are rated to an operating pressure of 175 psi and a burst pressure of at least 600 PSI.

Bonnet 202 may be a component of the valve casing 252 configured to seal the pressure vessel 112. Bonnet 202 is a solid piece that does not provide any opening between dry-side 210 and wet side 250 to avoid the need for a dynamic seal. The wet-side of bonnet 202 includes a recess 304 configured to receive wet-side magnet assembly 280. Recess 304 includes a lead screw seating 306 configured to receive atop end 262 of the lead screw 260.

Figure 4A:
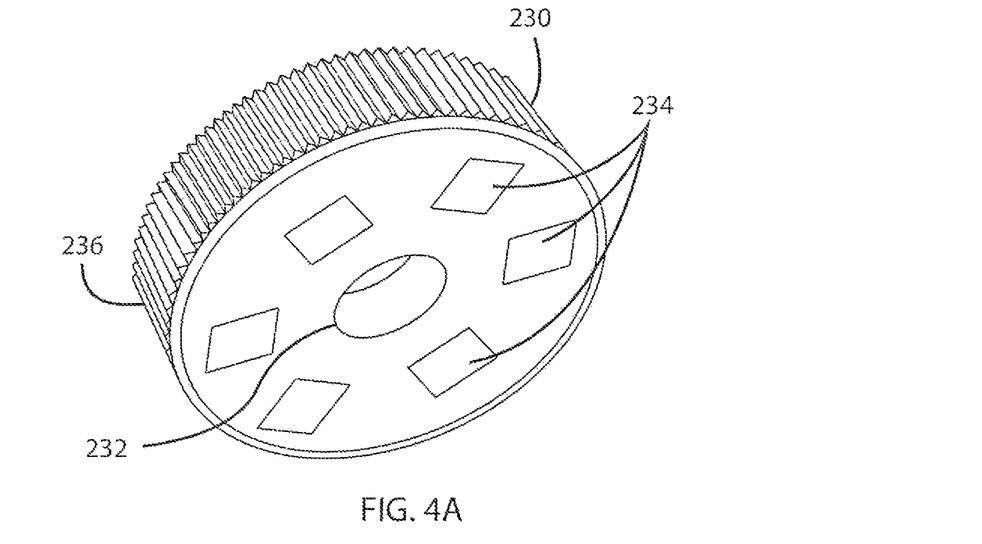
FIG. 4A is a top perspective views of a dry-side magnet assembly of the integral magnetically driven valve of FIG. 1, according to an exemplary embodiment.
Figure 4B:
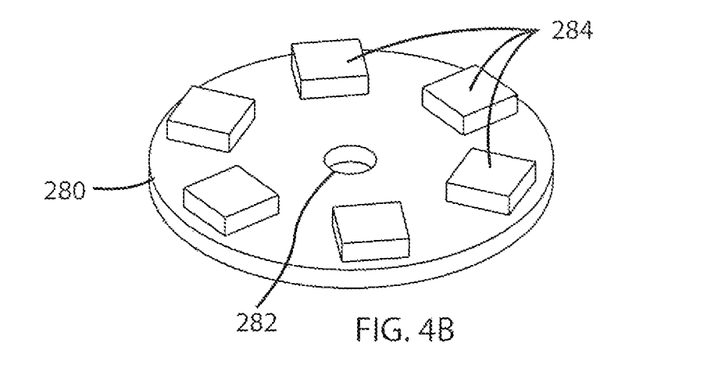
FIG. 4B is a bottom perspective views of a wet-side magnet assembly of the integral magnetically driven valve of FIG. 1, according to an exemplary embodiment.

Referring now to FIG. 4B, wet-side magnet assembly 280 is shown in a perspective view, according to an exemplary embodiment. Wet-side magnet assembly 230 includes a press fit aperture 282, a plurality of coupling magnets 284 on the top side of, assembly 280 that is positioned proximate to the bonnet 202. In an exemplary embodiment, the wet-side magnet assembly 280 may be press fit over the top end 262 of the lead screw 260 such that the lead screw 260 and the wet-side magnet assembly 280 are held in position by the top end 262 in the lead screw seating 306.

Referring now to FIGS. 2-4B, the dry side of bonnet 202 includes a dry-side magnet assembly seating post 308, set within a dry-side recess 312, and configured to seat within the bushing 232. The depth of the bushing 232 and the height of the dry-side seating post 308 are configured such that the bottom side of the dry-side magnet assembly 230 is positioned close to the bonnet 202 to maximize the magnetic coupling between dry-side magnet assembly 230 and dry-side magnet assembly 280, while avoiding contact with the bonnet 202 to avoid wear. Accordingly, the depth of recess 312 and recess 304 are configured to minimize the distance between the dry-side magnet assembly 230 and the wet-side magnet assembly 280, to maximize the magnetic coupling strength between the two assemblies, while also maintaining the pressure integrity of the pressure vessel 212.

Referring now to FIG. 4A, dry-side magnet assembly 230 is shown in a perspective view, according to an exemplary embodiment. Dry side magnet assembly 230 includes a bushing 232 and a plurality of coupling magnets 234 on the bottom side of assembly 230 that is positioned proximate to the bonnet 202. Bushing 232 may be any low friction bushing configured to receive and allow rotation of the dry-side magnet assembly 230 on the dry-side magnet assembly seating post 308, such as a sapphire bushing, a graphite bushing, a Kynar bushing, etc. An outer edge 236 of the dry-side magnet assembly 230 includes gearing teeth configured to interact with corresponding gearing teeth on drive gear 216 such that rotation of the drive gear 216 causes rotation of the dry-side magnet assembly 230.

Coupling magnets 234, 284 may be neodymium magnets. Coupling magnets 234, 284 further may be coated to prevent the individual magnets from degrading over time. Although dry-side magnet assembly 230 is shown and described as having a particular type of coupling magnets and a 6-pole configuration of the coupling magnets 234, 284, one of ordinary skill in the art should understand that a variety of types and configurations of magnets may be used to implement the magnetic coupling. For example, coupling magnets 234, 284 may be Sumerian cobalt magnets; single coupling magnets 234, 284 may be utilized, etc. in alternative embodiments.

Wet-side magnet assembly 280 includes, the plurality of coupling magnets 284 inserted in a top side on the assembly 280 proximate to the bonnet 202 when wet-side magnet assembly 280 is in situ within recess 304. Wet-side magnet assembly 280 may be rotationally fixed to the lead screw 260 such that rotation of the wet-side magnet assembly 280 causes rotation of the lead screw 260. Wet-side magnet assembly 280 may be configured without gearing teeth 236 since, rotation of the wet-side magnet assembly 280 is driven by rotation of the wet-side magnet assembly 280 based on a magnetic coupling of the coupling magnets 234 in a hetero-polar configuration between the two assemblies 230, 280.

Although a particular size and configuration of assemblies 230, 280 is shown, the diameter, configuration, etc. of magnet assemblies 230, 280 may be reconfigured to maximize magnetic coupling, torque applied to the lead screw 260 to close the gate 270, and overcome, for example, a 150 PSI pressure drop across the gate 270, while also meeting lay length requirements for the meter 110.

Referring again to FIG. 2A and drive motor 215 may be a battery operated DC motor configured to rotate a drive shaft 214 coupled to a drive gear 216. In operation, the flow restriction valve 200 can be actuated based on a received control signal 48 from the network data collector 128 or a related system. Actuation of the restriction valve 200 will cause motor 215 to rotate drive shaft 214 and drive gear 216 which will in turn dry-side magnet assembly 230 and based on the magnetic coupling, wet-side magnet assembly 280. Rotation of the wet-side magnet assembly 280 rotates the lead screw 260, moving the gate 270 along the lead screw 260 to allow or impede the flow through cavity 254. The drive motor 215 only needs to overcome frictional forces between the gate 270 and the lead screw 260 when the system isn't under pressure, such that drive motor 215 requires very electrical energy, and can therefore be powered by a small-capacity battery source.

Lead screw 260 includes atop end 262 and a bottom end 264 with a threaded portion 266 having a standard ACME thread between the portions 262, 264. Top end 262 is configured to seat within lead screw seating 306 and bottom end 264 is configured to seat within a seating in the bottom portion of valve casing 252.

Gate 270 is a Teflon block including a threaded aperture for receiving and riding along the threaded portion 266 of lead screw 260. According to an exemplary embodiment, gate 270 may have a clearance fit within valve casing 252 between valve inlet 256 and valve outlet 258. Gate 270 may further be sized such that, when the gate 270 is in a full open position, the cross section of the flow area of cavity 254 corresponds to the cross section of the pressure vessel 212 to avoid creation of pressure differentials in the flow path when the valve is fully open. Gate 270 may further be sized such that, when the gate 270 is in a full closed position, the gate covers the valve outlet 258 when pressed by system pressure against the valve casing 252.

Gate 270 may yet further be configured to allow free travel within casing 252 when the system isn't under significant pressure (i.e., there is no or minimal flow through meter assembly 100). Advantageously, allowing gate 270 to have free travel along lead screw 270 when the system isn't under significant pressure, reducing the need to overcome frictional forces between the gate 270 and the casing 252 when moving the gate along the lead screw 260 as further discussed below.

In operation, the gate 270 may be positioned at any position along the lead screw 260 between a full open position and a full closed position. The position of the gate 270 may be calculated by the control component 220 by measuring revolutions of the rotations of the dry-side magnet assembly 230, for example using a Hall sensor, and determining the position of gate 270 based on a known correlation between the revolutions and a position of the gate 270 on lead screw 260. Alternatively, in an alternative embodiment, gate position may be determined by directly sensing the position of the gate 270. Determining gate 270 positioning allows the control component 220 to position gate 270 to control flow volume, from between a maximum flow, with the gate 270 in the full open position near the top of the lead screw 260 and a minimum flow, with the gate 270 in the full closed position near the bottom of the lead screw 260.

When the gate 270 is positioned in a full closed position within the cavity 254, proximate to the bottom end 264 of lead screw 260, water flows through the inlet 256 pressing the gate 270 in closer proximity to the outlet 258 covering the outlet 258 such that the flow through assembly 100 is restricted, as explained in detail below.

When in the open position, inlet 256 and the outlet 258 are roughly in line through the cavity 254, allowing unimpeded flow of water through the valve 200. In the closed position, the gate 270 blocks the fluid pressure at inlet 256 from being applied to outlet 258. This pressure differential results in a net force that presses the gate 270 against the casing 252 blocking unimpeded now to outlet 258.

Further in operation, gate 270 may be configured to allow a minimal flow even when the gate 270 is in the full closed position, i.e., the fit between the gate 270 and the exit opening from the valve 200 is not a compression fit. The minimal flow may be based on seepage around die gate 270 based on a position of the gate 270 and lead screw 260 at a defined distance from an "exit face" from the cavity 254. For example, the gate may be configured to allow up to 0.01 gallons per minute. Advantageously, not having a compression fit in this embodiment eliminates a need for the motor and drive mechanism to be configured to drive the gate 270 into a compression fit, which would require greater torque requirement and battery drain. Alternatively, control board 220 may be configured such that the full closed position is less than a complete restriction of the flow, such that, for example, the closed valve will allow a required sustenance minimum of, for example, 0.25-1.0 gallons per minute even in the full closed gate position. Alternatively, control board 220 may be configured such that the full closed, position can be set, to any desired minimum flow.

Figure 5A:
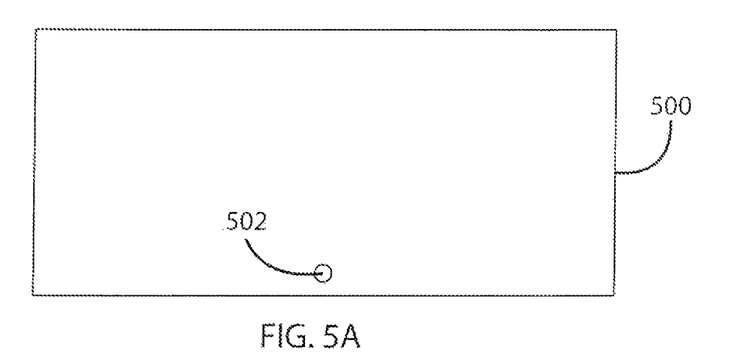
FIGS. 5A-C are front views of the gate of the magnetically driven valve of FIG. 2, according to alternative embodiments.
Figure 5B:
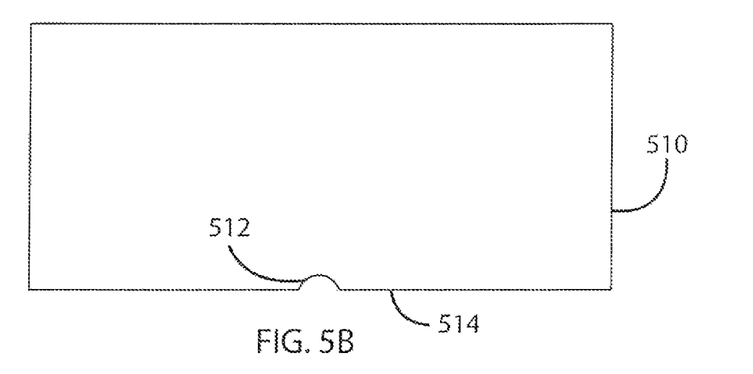
Figure 5C:
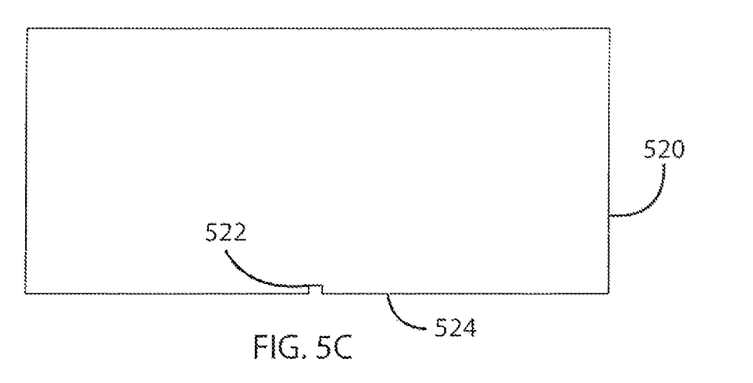

Referring now to FIGS. 5A-5C, gate 270 is shown according to alternative configurations. Specifically, gate 500 is shown in FIG. 5A as a rectangular gate having an aperture 502 configured based on the desired minimum flow. Gate 510 is shown in FIG. 5B as a rectangular gate having a roughly semi-circular cutout 512 along a bottom edge 514 of the gate 510, where the cutout is configured based on the desired minimum flow. Gate 520 is shown in FIG. 5C as a rectangular gate having a rectangular cutout 522 along a bottom edge 524 of the gate 520, where the cutout is configured based on the desired minimum flow. Advantageously, gates having an aperture and/or cutout portion further allow resolution to tune a flow restriction. For example, a gate 270, as shown in FIG. 2 may have a flow profile, determined based on a distance between the gate 270 and the full closed position, that features a very sharp rise in the flow rate starting at 11/6 of a turn of a magnet assembly from full closed position. Using a gate having an aperture and/or cutout portion will provide a different flow profile, allowing finer control over the flow restriction value.

Further, although the valve member is shown and described herein as a rectangular gate, one of ordinary skill in the art would understand that alternatives may be implemented within the boundaries of the invention described herein. For example, the gate may be shaped based on the corresponding shape of the valve housing (e.g, having a bowed bottom edge to mate with a curve in the valve housing). Alternatively, the valve member may be a diaphragm, a ball, etc.

Magnetically driven gate valve 200 takes advantage of the mechanical advantage of the lead screw. Further, control board 220 may be configured to communication with meter 116 such that the control board 220 can control the operation of the valve 200 based on a detected flow. Specifically, control board 220 may be configured to open or close the gate 270 during times of minimal or zero flow to avoid having to overcome system pressure in operating, the gate 270. Avoiding having to overcome system pressure reduces load on the motor 210, reduces system wear, and further conserves battery power.

Advantageously, using a gate valve 200 as Shown in the exemplary embodiment, it isn't necessary to shut off the flow prior to closing the valve. Gate valves, in order to open or close, primarily work against frictional forces as opposed to working directly against the system pressure forces caused by the flow of liquid through the gate. This configuration conserves power and further allows flexibility in closing the valve 200. For example, using a standard check valve, it may be necessary to interrupt flow in order to lock the valve into position, which is not the case with the gate valve 200.

Referring again to FIG. 1, gate valve 200 may be electronically connected to an automatic meter reading (AMR) system of a utility meter monitoring and communication system for sending and receiving control information for the valve 200. Gate valve 200 may be connected to the automatic meter reading (AMR) system through a communication connection to ultrasonic type water meter 110. Accordingly, to one exemplary embodiment, communication with control board 220 of valve 200 may be implemented using an ORION cellular endpoint, using a single daily cellular communication.

Advantageously, as shown in FIG. 1, integral utility valve 200 may be positioned downstream from the measuring system 116 such that utility flow is measured without undue interference to a uniform flow that may be caused by the valve 200. Specifically, valve 200, even in a full open position may introduce changes to a flow pattern, such as vortices, that can affect flow measurement using an ultrasonic flow measurement system.

According to an exemplary embodiment valve 200 may be powered using power from a battery of the flow meter 110. It will be apparent to those of ordinary skill in the art, that in the future, other numbers, and types of small, relatively low voltage and long-life batteries can be used.

Although the gate 270 in this disclosure is shown to be rectangular, it should also be understood that gate valves of other shapes, such as flat plates or semi-circles can be shown to work as well. There may be molding or packaging advantages for valve shapes other than rectangular. It is also contemplated that the casing 252 of valve 200 can be integrated with pressure vessel 200 to save space and simplify the manufacture of the water meter/valve combination.

It should also be understood that the water meter 110 with restriction valve 200 and the radio receiver 125 are all located at a customer site, which in some cases is a pit enclosure located in the ground. It should also be understood the that the network data collector 48 and radio transceiver 125 can be parts, of a fixed network, or can be parts of a mobile network, where the network data collector 148 is carried in a vehicle or is carried by a person engaged in meter data collection.

This has been a description of the preferred embodiments, bin it will be apparent to those of ordinary skill in the art that variations may be made in the details of these specific embodiments without departing from the scope and spirit of the present invention, and that such variations are intended to be encompassed by the following claims.

We claim:

1. A utility flow meter including a magnetically driven valve, the meter having a pressure vessel providing a flow path from a meter inlet to a meter outlet, the valve comprising:
   a valve member positioned within the valve in the pressure vessel for movement between an open position allowing flow unrestricted by the valve member through the flow meter and a flow restriction position in which flow through the flow meter is limited to less than the unrestricted flow; and
   an electrically operable control device for controlling movement of the valve member including a dry-side magnet assembly and a wet-side magnet assembly,
   wherein the electrically operable control device receives command signals to rotate the dry-side magnet assembly, inducing rotation of the wet-side magnet assembly to move the valve member and thereby increase or decrease flow through the metering chamber,
   wherein valve member is a gate configured for transverse movement along an axis of a lead screw rotationally fixed to the wet-side magnet assembly, wherein the transverse movement is driven by rotation of the wet-side magnet assembly and is perpendicular to a flow path of flow through the utility meter.

2. The utility flow meter of claim 1, wherein the electrical control device receives power from a self-contained power source.

3. The utility flow meter of claim 1, wherein the flow through the utility flow meter is not completely interrupted or shut-off.

4. The utility flow meter of claim 1, wherein the dry-side magnet assembly and the a wet-side magnet assembly are configured as opposing discs, each disc including a plurality of coupling magnets positioned along a same concentric circle on each disc, the radius of each opposing disc being perpendicular to the lead screw axis and creating a magnetic coupling between the assemblies through a static seal.

5. The utility flow meter of claim 4, wherein the rotation of a wet-side magnet assembly causes movement of the valve member, further wherein movement of the valve member corresponds to an increased or decreased flow through the metering chamber.

6. The utility flow meter of claim 4, wherein, when the gate is in the flow restriction position, flow through the utility flow meter is less than the unrestricted flow but is a measurable flow.

7. The utility flow meter of claim 6, further including a utility measurement system positioned upstream from the valve, such that flow passes from the utility measurement system to the valve.

8. The utility flow meter of claim 7, wherein the utility measurement system is an ultrasonic measurement system.

9. The utility flow meter of claim 7, wherein the electrically operated control device includes a motor driving a motor gear inducing rotation of the dry-side magnet assembly disc.

10. The utility flow meter of claim 7, wherein the electrically operated control device is in communication with the utility measurement system to control the gate based on a detected zero or minimal flow.

11. The utility flow meter of claim 1, wherein the valve member is positioned in front of a valve outlet in the flow restriction position and forced in the direction of the valve outlet when there is flow within the utility flow meter.

12. The utility flow meter of claim 1, wherein the pressure vessel is made of a cast metal.

13. The utility flow meter of claim 1, further comprising a radio transceiver located at a customer's site with the utility flow meter and configured to receive command signals to cause the electrically operated control device to restrict flow through the pressure vessel to less than the unrestricted flow.

14. A magnetically driven valve for controlling movement of a valve member in a flow path, the valve comprising:
   the valve member positioned within the flow path for movement between an open position allowing flow unrestricted by the valve member and a flow restriction position in which flow is limited to less than the unrestricted flow; and
   an electrically operable control device for controlling movement of the valve member including a dry-side magnet assembly and a wet-side magnet assembly,
   wherein the electrically operable control device receives command signals to rotate the dry-side magnet assembly, including rotation of the wet-side magnet assembly to move the valve member and thereby increase or decrease flow along the flow path,
   wherein valve member is a gate configured for transverse movement along an axis of a lead screw rotationally fixed to the wet-side magnet assembly, wherein the transverse movement is driven by rotation of the wet-side magnet assembly and is perpendicular to a flow path of flow through the utility meter.

15. The magnetically driven valve of claim 14, wherein the dry-side magnet assembly and the a wet-side magnet assembly are configured as discs, each disc including a plurality of coupling magnets positioned along a concentric circle on each disc, the radius of each disc being perpendicular to the lead screw axis and creating a magnetic coupling between the assemblies through a static seal.

16. The magnetically driven valve of claim 14, wherein the valve member is positioned in front of a valve outlet in the flow restriction position and forced in the direction of the valve outlet when there is flow along the flow path.

17. The magnetically driven valve of claim 14, further including a utility measurement system positioned upstream from the valve, such that flow passes from the utility measurement system to the valve.

18. A utility flow meter including a valve having a pressure vessel providing a flow path from a meter inlet to a meter outlet through the valve, the valve comprising:
- a pressure vessel formed to contain the valve positioned downstream from a flow measurement system in a pressure vessel having a lay length of 7.5 inches;
- a valve member positioned within the valve in the pressure vessel for movement between an open position allowing flow unrestricted by the valve member through the flow meter and a flow restriction position in which flow through the flow meter is limited to less than the unrestricted flow; and
- an electrically operable control device for controlling movement of the valve member including a dry-side magnet assembly and a wet-side magnet assembly,
- wherein the electrically operable control device receives command signals to rotate the dry-side magnet assembly, inducing rotation of the wet-side magnet assembly to move the valve member and thereby increase or decrease flow through the metering chamber,
- wherein valve member is a gate configured for transverse movement along an axis of a lead screw rotationally fixed to the wet-side magnet assembly, wherein the transverse movement is driven by rotation of the wet-side magnet assembly and is perpendicular to a flow path of flow through the utility meter.

* * * * *